Sept. 14, 1965   A. A. MATTHIES   3,205,675
VALVE WITH BIMETAL MEANS FOR REFRIGERATION SYSTEM
Filed March 20, 1962

INVENTOR.
ALAN ARTHUR MATTHIES
BY
ATTORNEY

United States Patent Office 3,205,675
Patented Sept. 14, 1965

3,205,675
VALVE WITH BIMETAL MEANS FOR
REFRIGERATION SYSTEM
Alan A. Matthies, Milwaukee, Wis., assignor to Controls Company of America, Schiller Park, Ill., a corporation of Delaware
Filed Mar. 20, 1962, Ser. No. 181,059
5 Claims. (Cl. 62—202)

This invention relates to fluid flow control devices of the bimetal operated type.

The primary object of this invention is to provide a flow control device that modulates flow of the controlled fluid in response to the dissipation of heat from the valve operator due to changes in the state, temperature, or flow rate of the fluid being controlled.

Another object of this invention is to provide a flow control device that can be quickly and easily adjusted to respond to a predetermined fluid condition.

A further object of this invention is to provide a flow control device that is easy to fabricate, quiet in operation and substantially maintenance-free.

These objects are accomplished by positioning a bimetal type valve operator for a flow control device in the flow path of the fluid to modulate the flow of fluid in response to changes in the characteristic of the fluid. The bimetals are initially deflected to set the control valve in a partially opened position or a heater is energized to provide a predetermined amount of heat for deflecting the bimetals to establish a predetermined flow rate through the control valve. The bimetal operator is positioned in the flow path so that it will respond to the rate of heat dissipation of the bimetals caused by changes in the state, flow rate or temperature of the fluid. This type of valve has been found to be of particular importance in systems where the fluid controlled is to be maintained at a zero superheat condition. Any change from this condition will produce a substantial change in the heat dissipation rate of the bimetal operator which will produce a modulating effect on the valve. Since a bimetal is a relatively slow acting device, the changes in flow rate due to a change in the fluid will produce a slow change in the flow thereby eliminating any "hunting" in the valve.

Other objects and advantages will be pointed out in or be apparent from the specification and claims, as will obvious modifications of the single embodiment shown in the drawings, in which:

Figures 1, 2, 3:
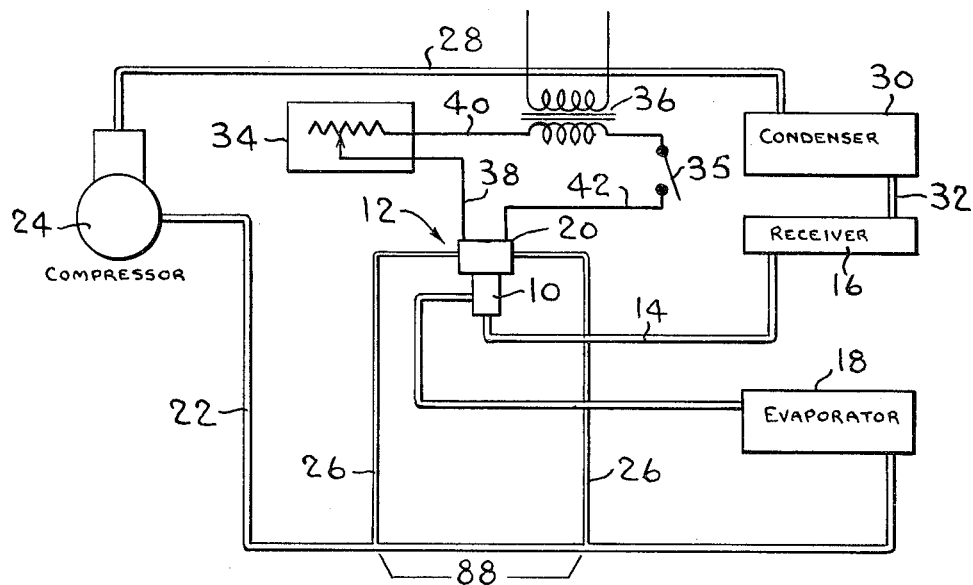
FIG. 1 is a schematic diagram of a refrigeration circuit incorporating the present flow control device.
FIG. 2 is a sectional view of the flow control device with the valve closed.
FIG. 3 is a view similar to FIG. 2 with the valve open.

Referring to FIG. 1, a refrigeration system is shown having valve section 10 of flow control device 12 connected to control the flow of refrigerant through line 14 between receiver 16 and evaporator 18. Valve operator section 20 of the flow control device is connected in by-pass line 26 to respond to the flow of refrigerant in suction line 22 between the evaporator and compressor 24. The compressor is connected to the receiver through line 28, condenser 30 and line 32. A refrigeration system is shown by way of example only since the control device can be adapted to any use where the flow of fluid is to be regulated in response to a change in the media, environment, or condition of the fluid regulated.

The valve section of the flow control device includes a housing 44 having an inlet 46 and an outlet 48 with a control orifice 58 connecting the inlet to the outlet. Valve stem 60 projects through orifice 62 in the housing with one end cooperating with the control orifice to control the flow of refrigerant through the orifice and the opposite end extends into housing 64 for the valve operator which is mounted on the valve section housing and has an inlet 66 and an outlet 68 connected to a central control chamber 70. Heater enclosure 72, 74 is positioned in the control chamber with bimetal heater 76 positioned in groove 78 in enclosure 72. A number of bimetal discs 80 are positioned within the heater enclosure and are retained on the valve stem by flange 82. The bimetals are enclosed within the enclosure by top 84 with spring 86 acting between the top and flange to seat the valve stem in the orifice.

The bimetals are initially heated by closing switch 35 in line 42 completing a circuit from the bimetal heater to transformer 36 and back through lines 40 and 38 to the heater. A predetermined amount of heat will be radiated from the heater producing a predetermined deflection in the bimetals that will set up an initial or base flow rate through the valve. If desired, a rheostat 34 can be connected in lines 38 and 40 to provide a means for varying the heat output of the heater and consequently a different flow rate through the valve. Fluid will flow through the valve operator housing and into the bimetal enclosure through holes 39. As long as the fluid is at or near the desired temperature and flow rate there will be no change in the deflection of bimetals.

In operation, the heater is energized a predetermined amount by closing the switch or by setting the rheostat. The heat radiated from the heater will elevate the temperature of the bimetal stack creating an increase in the over-all stack dimension. The high expansion sides of the bimetals are adjacent each other and the low expansion sides are adjacent each other so that any deflection of the bimetals will produce an increase in the over-all dimension of the stack when heated. The valve stem will be moved away from the orifice allowing refrigerant to flow into the evaporator with the necessary pressure drop needed to establish evaporative cooling. Liquid refrigerant will continue to be fed into the evaporator unhindered until liquid refrigerant reaches the suction line and passes through the housing for the valve operator. When this condition occurs, liquid refrigerant will enter the heater enclosure subjecting the bimetal discs to tremendous cooling resulting in the closing or modulation towards closing of the valve stem.

It should be apparent that the valve will stabilize, with respect to the liquid refrigerant fed into the evaporator through the orifice, such that all of the refrigerant is just boiled off in the evaporator at the point where the flow enters the valve operator housing. In other words, a superheat condition will not occur in the evaporator but will occur when the refrigerant passes the intersection point of the suction line with the valve operator in the control device. Furthermore, a superheat condition must exist in the suction line at a point beyond the valve operator otherwise liquid refrigerant will enter the compressor. If the load on the evaporator increases, the refrigerant will change to a vapor in the evaporator ahead of the valve operator decreasing its heat loss so that it will slowly open the preselected amount. More refrigerant will be fed into the evaporator to meet the higher load demand and again establish a balanced heat input to heat loss condition in the valve operator. A drop in load produces excess liquid in the power element and the resultant cooling tends to close the valve and reduce refrigerant flow re-establishing system balance.

One important advantage of this device is that it is able to use the latent heat of vaporization of the liquid refrigerant as the control media for the evaporator. The advantage of using the latent heat of vaporization of the fluid as the reference is better understood when it is realized that Freon 12, for example, requires 60,309 B.t.u./lb. while the specific heat is only .094 B.t.u./lb./° F. The cooling effect of liquid Freon will cause a higher heat dissipation rate than Freon under a superheat condition. The response of the bimetal at the moment liquid Freon drops on the bimetal, therefore, is relatively rapid. This makes the device extremely sensitive and provides a relatively large power for a minimum power input.

The heat output of the heater determines the amount of cooling by restricting the flow of liquid to the evaporator. A simple rheostat control is shown in the drawings to accomplish this function. A more refined control system could be used with this system by connecting switches in the circuit that are responsive to head pressure, evaporator temperature, or frost accumulation. These switches need only handle the relatively light load of the heater, as opposed to the load of the compressor to which such switches are normally subjected. The valve operator section could be connected directly into the suction line by eliminating section 88. The control will then respond to the fuel flow rate providing a more sensitive control.

Although but one embodiment of the present invention has been illustrated and described, it will be apparent to those skilled in the art that various changes and modifications may be made therein without departing from the spirit of the invention or from the scope of the appended claims.

I claim:

1. A fluid flow control device comprising, in combination, means defining a first fluid flow passage, means defining an orifice in said first fluid flow passage, valve means mounted for movement in two directions with respect to said orifice for opening and closing said orifice, means connected to and biasing said valve means in one of said directions and bimetal means connected directly to said valve means for moving said valve means in the other of said directions, means arranged in heat transfers relationship with said bimetal means for heating said bimetal means to move said valve means to establish a base valve means opening and predetermined rate of fluid flow through said orifice, and means for circulating at least a portion of said fluid past said bimetal means after said fluid has passed through said first fluid flow passage so that heat transfer occurs between said bimetal means and said fluid to modulate said valve means about said base opening and predetermined flow rate in accordance with heat transfer between said bimetal means and said fluid, said valve means being biased toward a closed position and said bimetal means being operative in response to an increase in temperature to open said valve means, said bimetal means comprising a plurality of bimetal discs having their high expansion sides adjacent each other and their low expansion sides adjacent each other.

2. In a refrigerator system having a compressor, a condenser, and an evaporator connected to form the system, a flow control device comprising in combination,
   means defining a first passage through said device and connected for flow of fluid from said condenser to said evaporator,
   valve means in said first passage for controlling the flow of fluid therethrough,
   temperature responsive valve operator means directly connected to said valve means for opening and closing said valve means,
   means for actuating said temperature responsive valve operator means to establish a base valve means opening and a predetermined rate of fluid flow through said first passage,
   and means for conducting at least a portion of the fluid flow leaving said evaporator past said temperature responsive means with heat transfer occurring between said temperature responsive means and said portion of said fluid to modulate said valve means about said base opening and predetermined flow rate in accordance with said heat transfer so that said temperature responsive means responds to the temperature and state of the fluid flowing between the evaporator and the compressor and a zero degrees superheat condition can be maintained at the terminal end of the evaporator, said temperature responsive means including bimetal means, said valve operator actuating means comprising an electrical heater positioned in heat transfer relation with said bimetal means, and a rheostat included in circuit with said heater for varying the base valve means opening and predetermined flow rate.

3. In a refrigeration system having a compressor, a condenser and an evaporator, a control device comprising, in combination, a housing, means defining a fluid flow passage said housing and connected for flow of fluid between the discharge side of said compressor and the evaporator, valve means in said fluid flow passage for controlling fluid flow through said passage, means biasing said valve means to a closed position and bimetal means connected directly to said valve means and arranged solely to move said valve means away from said closed position when heated, electrically energized heater means arranged in heat transfer relation with said bimetal means and operative, when energized, to heat said bimetal means to move said valve means to establish a predetermined flow rate from said compressor to said evaporator, said housing including a compartment within which said bimetal means is disposed, said compartment being closed except for means defining a fluid communication with said fluid flow passage connecting the compressor inlet and the evaporator discharge for admitting refrigerant fluid to said compartment and into heat exchange relation with said bimetal means, said compartment being defined by wall means capable of withstanding all pressures within said refrigeration system without substantial deformation, whereby said valve means is modulated solely in response to heat transfer occurring between said metal means and said fluid to modulate said valve means about said base opening and predetermined flow rate in accordance with heat transfer between said bimetal means and fluid.

4. A fluid flow control device comprising, in combination, means defining a first fluid flow passage, means defining an orifice in said first fluid flow passage, valve means mounted for movement in two directions with respect to said orifice for opening and closing said orifice, operating means connected to and biasing said valve means toward a closed position and including bimetal means connected directly to said valve means and operative in response to an increase in temperature to open said valve means, means arranged in heat transfer relationship with said bimetal means for heating said bimetal means to move said valve means to establish a base valve means opening and predetermined rate of fluid flow through said orifice, and means including a second fluid flow passage communicating with said bimetal means to direct at least a portion of said inlet to said bimetal so that heat transfer occurs between said bimetal means and said fluid portion to modulate said valve means about said base opening and predetermined flow rate in accordance with heat transfer between said bimetal means and said fluid.

5. In a refrigeration system having a compressor, a condenser and an evaporator connected to form the system, a flow control device comprising, in combination, means defining a first passage through said device and connected for flow of fluid from said condenser to said evaporator, valve means in said first passage for controlling the flow of fluid therethrough, temperature responsive valve operator means including bimetal means and directly connected to said valve means for opening and closing said valve means, an electrical heater positioned in heat transfer relation with said bimetal means and operative to actuate said temperature responsive valve operator means to establish a base valve means opening and a predetermined rate of fluid flow through said first passage, and means for directing at least a portion of the fluid flow leaving said evaporator to said temperature responsive operator means with heat transfer occurring between said temperature responsive operator means and said portion of said fluid to modulate said valve means about said base opening and predetermined flow rate in accordance wtih said heat transfer so that said temperature responsive means responds to the temperature and state of the fluid flowing between the evaporator and the compressor and a zero degrees superheat condition can be maintained at the terminal end of the evaporator.

References Cited by the Examiner

UNITED STATES PATENTS

| | | | |
|---|---|---|---|
| 1,969,102 | 8/34 | Shenton | 62—225 |
| 2,078,966 | 5/37 | Newill | 62—224 |
| 2,463,951 | 3/49 | Carter | 62—225 |
| 2,534,455 | 12/50 | Koontz | 62—225 |
| 2,735,272 | 2/56 | Lange | 236—68 |

FOREIGN PATENTS 1,055,018   4/59   Germany.

ROBERT A. O'LEARY, *Primary Examiner.*

MEYER PERLIN, *Examiner.*

UNITED STATES PATENT OFFICE
CERTIFICATE OF CORRECTION

Patent No. 3,205,675                                  September 14, 196

Alan A. Matthies

It is hereby certified that error appears in the above numbered patent requiring correction and that the said Letters Patent should read as corrected below.

Column 3, line 38, for "transfers" read -- transfer --; column 4, line 16, before "said" insert -- in --; line 38, for "metal" read -- bimetal --; same column 4, line 56, for "inlet" read -- fluid --.

Signed and sealed this 31st day of May 1966.

(SEAL)
Attest:

ERNEST W. SWIDER                                     EDWARD J. BRENNER
Attesting Officer                                         Commissioner of Patents